Dec. 9, 1958  O. R. OLSON  2,863,643
GALVANIZING FURNACE TEMPERATURE CONTROL
Filed Sept. 6, 1952  3 Sheets-Sheet 2
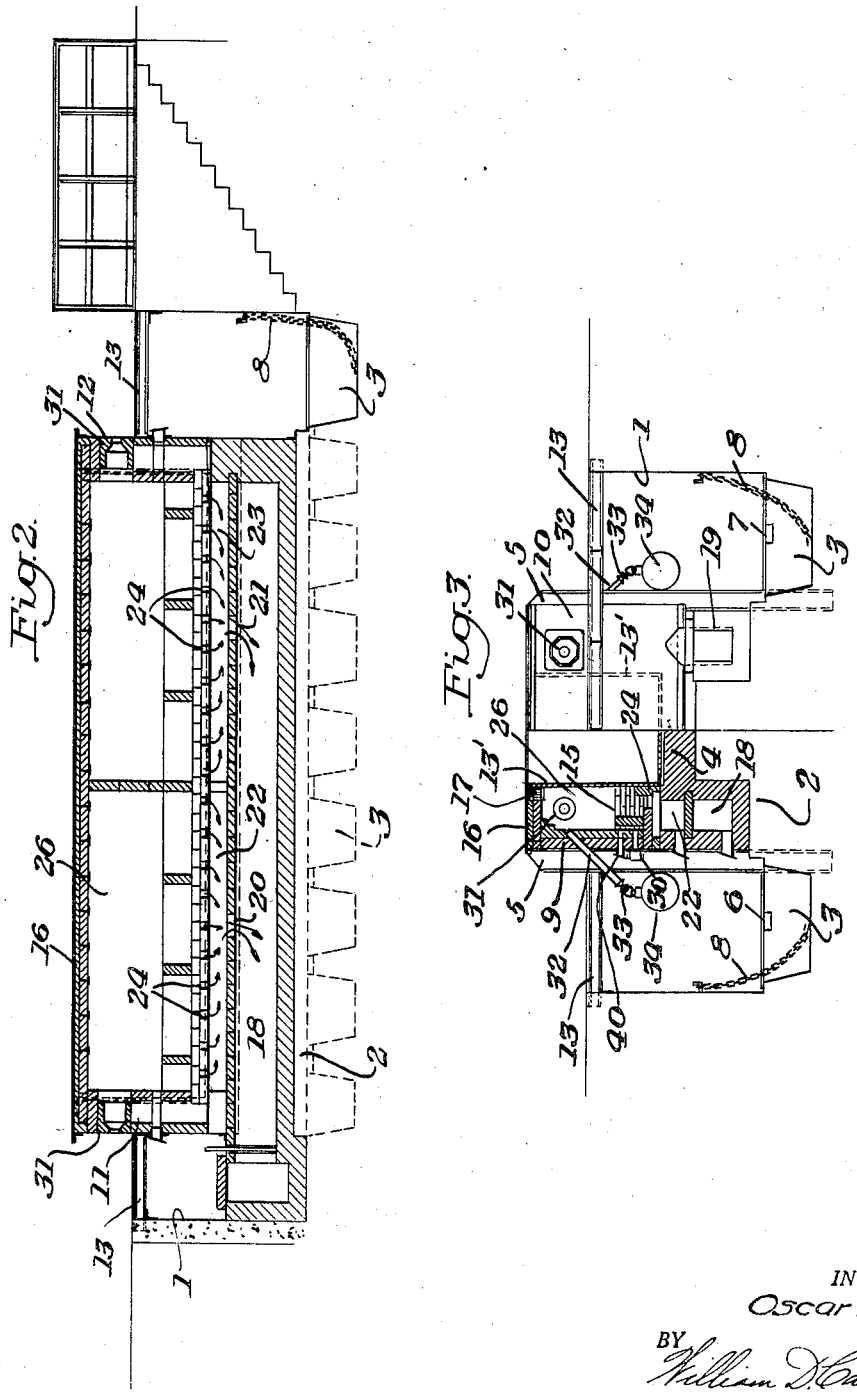
INVENTOR.
Oscar R. Olson.
BY
His Attorney Dec. 9, 1958   O. R. OLSON   2,863,643
GALVANIZING FURNACE TEMPERATURE CONTROL
Filed Sept. 6, 1952   3 Sheets-Sheet 3

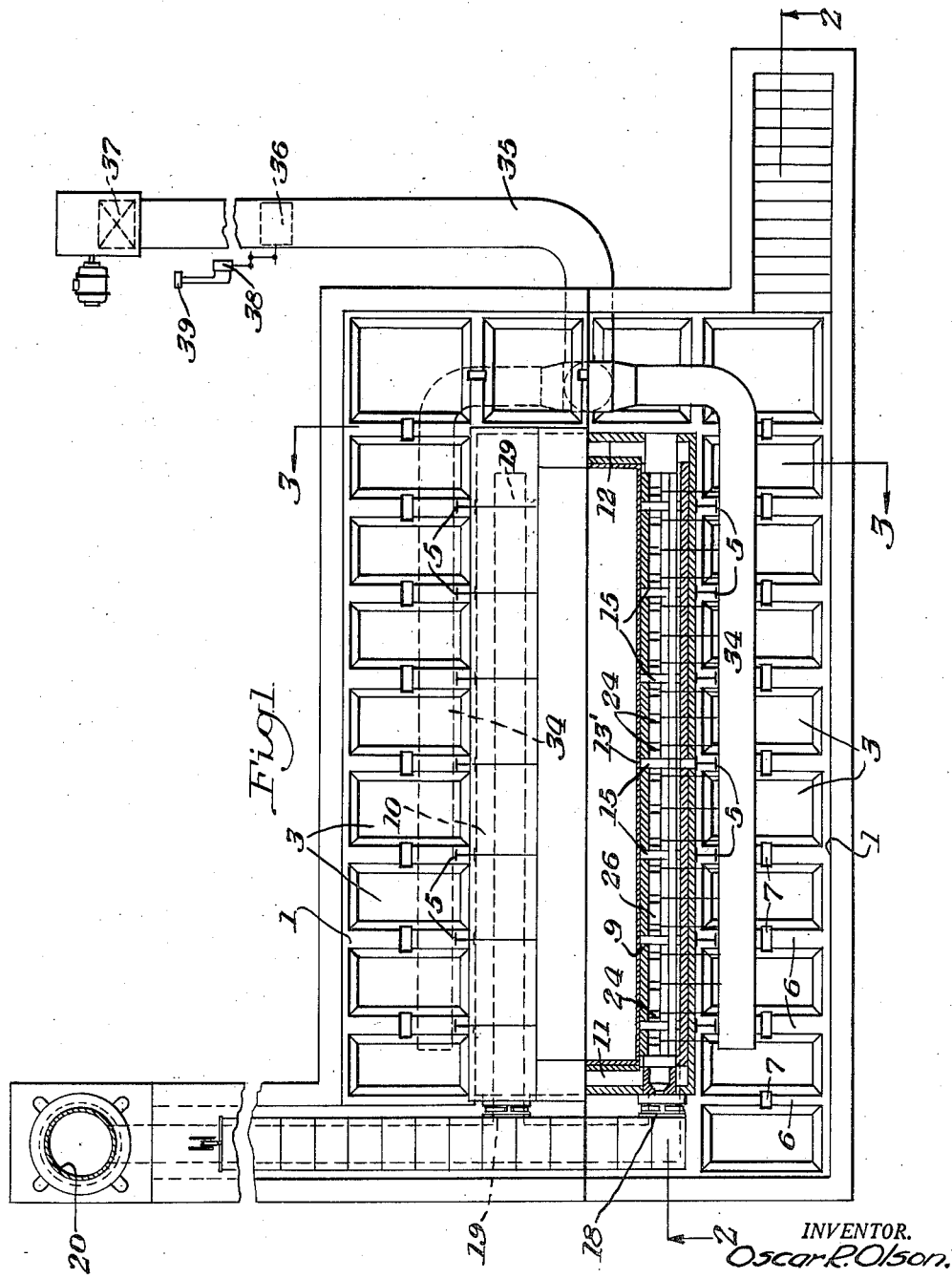

INVENTOR.
Oscar R. Olson.
BY William D. Carothers
His attorney

United States Patent Office 2,863,643
Patented Dec. 9, 1958

2,863,643

GALVANIZING FURNACE TEMPERATURE CONTROL

Oscar R. Olson, Pittsburgh, Pa.

Application September 6, 1952, Serial No. 308,268

5 Claims. (Cl. 257—4)

This invention relates generally to improvements in kettle furnaces, and more particularly to the control of the heating of kettle furnaces required to supply a variable load.

Kettle furnaces are generally provided with a large tank containing a liquid bath such as a salt solution, a spelter of lead, tin, or zinc, for heating or coating metals by immersing them. Kettle furnaces may be heated by the use of light or heavy oils, or by the use of gas, such as a natural or artificial gas. When a particularly heavy load has been required to pass through a furnace, such as a galvanizing kettle furnace, the coating of the metal parts materially reduces the temperature of the bath and the controls create an increased demand for fuel to bring the furnace back to its normal temperature. The increased fuel is turned on and about the time that the furnace is back up to the proper temperature, and the load creating the high loss is suddenly reduced, the sensible heat of the furnace structure rapidly increases the temperature of the furnace to such a degree that the materials making up the bath become volatile and the volatile loss of the same is found to be material. To avoid this loss, it is within one of the features of this invention to provide means for quickly cooling the furnace by blowing cold air into the combustion chamber until it has reached the proper temperature, at which the furnace would be maintained during its idling period, and which is below the volatile point of the spelter or both, thus avoiding loss.

Another object is to provide a structure wherein the discharge of the combustion chambers is controlled to provide a uniform distribution of the heat and a uniform distribution of the cooling air for controlling the heating and the idling temperature of the kettle furnace.

In order to attain these objects, the kettle furnace must be provided with a series of openings through which a blast of air at ordinary temperature may be inserted. These blow points must be uniformly distributed throughout the combustion chamber. It is preferable to direct them against the roof and toward the side of the kettle so that the air will be effective at the position of the hottest part of the flame to quickly cool the combustion chamber, as well as the kettle to the normally idling temperature of the furnace. Thus, it is necessary to provide thermal means which are effective to operate the supply of fuel and cold air in accordance with the temperature of the bath. These controls must be adjustable for the different types of baths that could be employed in the kettle. Again, it is preferable not to turn off the fire, but to allow it to diminish to the pilot, idling, or non-use character of flame, so as to maintain the proper pilot temperature of the combustion chamber and the kettle immediately upon the shutting off of the cooling air. To further augment and properly control the operation of the heating, as well as the cooling medium, the flue structure has been changed to discharge the gases from the combustion chamber in such a way as to create a uniform distribution of the heat when the furnace is being heated and to create a uniform distribution of cooling air to properly cool the same uniformly throughout.

Other objects and advantages appear in the following description and claims.

The accompanying drawings show, for the purpose of exemplification, without limitation of the invention or claims thereto, certain practical embodiments of the invention wherein:

Fig. 1 is a plan view of a kettle furnace, part of which is in section, illustrating the manner of distributing cooling air to a kettle furnace.

Fig. 2 is a sectional view taken along the line 2—2 of Fig. 1.

Fig. 3 is a partial sectional view taken along the line 3—3 of Fig. 1.

Fig. 4 is a diagrammatic view illustrating the control circuits for operating the heating and cooling air control.

Referring to the drawings, the furnace is built within the pit defined by the walls 1, which is lined with reinforced concrete, and is provided with a foundation as indicated at 2, in Fig. 3. The mat 4, which is seated upon the top of the foundation 2, is arranged to support the furnace including the side walls. The plurality of stays 5, are embedded in an upright position in the foundation 2, and are employed to support the furnace walls 9, and 10, and the end walls 11 and 12. The stays and the end wall structure are supported laterally by horizontal brace members 13, which extends between the walls of the furnace and the wall of the pit, all around the furnace, as indicated in Figs. 2 and 3.

The mote 3 is provided with a plurality of partitions having weir openings in the upper portion thereof for receiving and uniformly distributing the bath from the kettle if it were to burst. The mote 3 is lower than any other portion of the furnace, including the flues, which prevents the contents of the kettle from stopping the flues. When the material solidifies within the sections of the mote, a chain, as indicated at 8, is left within the mote for the purpose of removing the same from the compartments formed by the partitions. The kettle or tank 13' is constructed of heavy steel plate, and is rectangular in shape. This tank is seated upon the mat 4 that is supported on the foundation 2 and a small retaining wall extends around the lower end thereof, for the purpose of anchoring the tank in position. A series of piers 15 extend from the low wall 14 to more than halfway up the side walls of the tank for the purpose of supporting the same from the stays 5. It will be noted that each pier and partitional wall is disposed opposite from and extends to a stay. These piers are made of ceramic material, and represent the only lateral support of the side walls of the kettle or tank, with the exception of that provided by the roof of the furnace, which extends from the top of the stays to the upper rim of the tank, as indicated at 16. The roof of the furnace is interlocked adjacent the kettle 13', as indicated at 17, and rests on top of the walls of the furnace.

Below the level of the bottom of the tank, the furnace is provided with a flue on each side thereof, as indicated at 18 and 19. These flues extend the full length of the furnace, starting from the end wall 12, and extending through the end wall 11, where they are connected by a lateral flue that runs to the stack, as indicated at 20.

As shown in Fig. 2 and Fig. 3, each flue 18 and 19 is provided with two openings, 20, 20a and 21, which connect them with primary flues 22 and 23. The primary flues 22 and 23 are in turn connected to the lower end of the combustion chamber through the ports 24, the opening of which is regulated by means of the valve members 25. Thus, the opening of each of the ports 24 may be varied from one end of the primary flues 22 and 23 to the other, to provide a uniform withdrawal of the products of the combustion chamber to the primary flues 22 and 23 from whence the gases are further discharged through the ports 20a and 21 to the secondary flues from which the gases travel to the stack 20. Thus, by regulating the opening of the ports 24, one is enabled to uniformly withdraw the gases and thus distribute the heat in the secondary combustion chamber 26. The secondary combustion chamber 26 is provided with an upstanding bridge wall 27 that divides the same to form a primary combustion chamber 28. The burner, as indicated at 30, is provided in the furnace wall opposite each flue opening 24. Each burner supplies combustible fuel to the primary combustion chamber 28, from whence it rises into the secondary combustion chamber 26, and then passes downwardly adjacent the kettle and through the ports 24 to the primary flues 22 and 23, and thence to the secondary flues 18 and 19, then off to the stack. Additional burners 31 are provided in the end walls of the furnace.

The secondary combustion chamber 26 is provided with a series of air injecting tubes 32, as shown in Fig. 3, each of which is controlled by a valve 33, and is connected to the distributing pipe 34, as shown in Fig. 1. The distributing pipe 34 passes to the end of the furnace where it is connected by the supply pipe 35, controlled by the valve 36 and blower member 37. The valve or damper 36 is actuated by the servomotor 37 through the control unit 38 for the purpose of supplying air to the distributing pipe 34 from whence it may be supplied to adjacent the top of the combustion chamber for the purpose of rapidly cooling off the furnace.

After a heavy furnace load has been passed through the kettle, the bath, or other liquid therein, becomes cooled, owing to the fact that the furnace load has absorbed the heat from the same. Such a reduction in heat requires a material increase in the supply of heat. When the temperature of the furnace has been increased to quickly bring the spelter up to the proper temperature, it will have been found that a materially greater amount of heat was supplied than that actually required after the load is suddenly shut off, and not passed through the furnace. This creates a condition wherein a materially greater amount of heat is being currently supplied to compensate for the heat losses due to the previously heavy furnace load. Since the load has been diminished, the heat is no longer necessary, but the sensible heat within the spelter and within the furnace itself is present, even though the fuel has been reduced to that of a holding heat. Under such conditions, the temperature control, which determines that the furnace is materially hotter than a predetermined amount, will function to turn on the supply of cooling air and open the valve 36 to permit the cooling air to be blown into the combustion chamber and out the flues. This passage of excess cooling air is inserted commensurate with the pilot flame from the burners, and it readily cools the combustion chamber and the furnace down to such a degree that the spelter or other constituents being heated in the furnace kettle will not volatilize. As soon as the temperature of the furnace has been reduced to a degree that prevents volatilization or disintegration of the material within the kettle furnace, the air is shut down, and the pilot light maintains the kettle at the proper temperature until such time that the temperature of the furnace rises to a temperature that causes depletion or spoilage of the contents in the kettle.

Referring again to Fig. 3, it will be noted that a second burner 40 is provided above the main burners 30, which burner is known as the holding burner, and which provides a flame sufficient to maintain the furnace heated at all times when not in use and when the burners 30 are shut off. The controls of these burners are shown in Fig. 4. In view of the fact that there are four secondary combustion chambers 26, two on each side of the furnace, it is necessary to provide four different sets of holding and operating burners which are indicated schematically in Fig. 4. The diagrammatic showing of Fig. 4 illustrates the use of burners equipped to supply oil as a fuel in the combustion chambers 26. This system of heating requires the use of steam for cleaning out the oil lines of the main burners 30, and for keeping these lines hot by continuously discharging steam therethrough when the fuel is shut off. Air is supplied to the burner with the fuel for the purpose of supporting the combustion of the same.

As shown in Fig. 4, the oil supply lines 41 are directed to the relief valves 42, which determine the initial pressure of the oil supply, and the oil bypassed by this relief valve, returns to the oil supply through the pipe lines 43. The oil then passes through the shut-off valve 44. The filter 45 and the oil pressure regulator 46, to the air-oil ratio control device 47, the air pressure being supplied through the line 48. The oil then branches into two lines, as illustrated at 50 and 51 the line 50 passing through the shut-off valve 52, and the check valve 53, to the magnetically operated temperature control shut-off valve 54, and thence through the pipe 55 and the burners 30. When the oil is shut off, the steam is supplied through the pipes 56, which is connected to a steam trap 57 and passes through a shut-off valve 58 and a magnetically operated control valve 59, after which it is connected directly with the oil line 55 and passes out through the line 55. This keeps the line and the burner clean of oil when the oil is shut off and keeps them hot until the oil is again turned on, at which time the steam is turned off. The air line 48 is connected back through the air supply line 60 to the valve 61 which is known as the control valve for the supply for combustion air to the operating burners 30. Immediately on the other side of the valve 61, a second pair of supply lines 62 controlled by the air valve 63 which is the combustion air for the holding burners 31 and the air line 64 which is connected ahead of the control valve 63, supplies additional air to the operating and holding burners for aiding in the atomization of the fuel. The air is obtained from what is known as the combustion air supply 65. Each of the butterfly valves 61 and 63 are controlled by the control mechanism 66, which in turn, is controlled by the thermocouple 67, and which functions to operate in opening and closing the electromagnetic shut-off valves 54 in the oil lines, and the valve 59 in the steam line, when the furnace temperature reaches a predetermined maximum. A second thermocouple 68 operates the thermal control 69. The thermocouple 68 actuates the thermal control unit 69 for operating the switch 39 which controls the operation of the motor for the fan 37 and the servomotor 38 for the valve 36 to supply cooling air through the pipe 35. Thus, when the temperature rises sufficiently, the thermocouple 67 functions to operate the thermal control device 66 to close or shut off the supply of oil and air to the burner 30, and turn on the supply of steam, but at the same time, the thermocouple 68 actuates the responsive device 69 which functions to supply the cooling air through the system to quickly bring the temperature of the furnace down to the proper degree of heat.

The holding burners 40 which are supplied by oil through the lines 51 are supplied by air through the lines 62. However, the auxiliary air line 64 is connected to constantly supply air through the valves 70 and 71 to the burners 30 and 40 respectively. In other words, by controlling the valves 70 and 71 adjacent the furnace, the burners 30 and 40 may be constantly supplied with air directly from the atomizing air line 64 that is not controlled and which continuously supplied air both to the operating and holding burners 30 and 40, at all times. Thus, when the fuel is shut off and the steam is turned on, the burners are still supplied with air from the lines 64, providing the valves 70 are opened. And a certain amount of air may likewise be continuously supplied from the line 64 to the burners 40 at all times.

The purpose of supplying the steam to the fuel line, is to provide sufficient heat to purge the fuel line and the burner of the heavy fuel, and prevent the same from becoming coked or otherwise congealed in the line, and also to maintain the fuel line hot, so that when the control 66 again shuts off the steam, and turns on the valve 54 to provide a supply of fuel to the burner 30, the fuel will be submitted to a hot line, and thus, will not clog or otherwise congeal therein. In this way, lines to the operating burners are always kept open and warm, and the steam does not in any way, interfere with the maintenance of the furnace temperature, nor does it interfere with the operation of the holding burners, but aids them.

The supply of air to the holding burners is varied by the control 66, but not the supply of fuel for the purpose of maintaining the proper supply of heat to the combustion chambers. Thus, the valves 61 and 63 which are in effect proportioning valves, and merely regulate the amount of air supplied to the burners at the same time, the valves 54 are regulating the amount of fuel supplied to the burners 30 for the purpose of maintaining the proper temperature within the combustion chamber when the furnace is operating under load.

When the temperature control 66 functions to shut off the valve 54 and turn the steam valve 59 on, the proportioning regulators 61 and 63 are adjusted to reduce the supply of air to the system, however, the air continues to be supplied from the line 64 with the steam to the burner 30.

The atomizing air which is directed to both the operating burner, and the holding burners, is continuously supplied to these burners 30 and 40, regardless of whether or not fuel or steam is being supplied to the burners 30. This air, in combination with the air supplied through the temperature control 69, for the purpose of cooling the combustion chamber, functions to supplement the cooling air, and continues to be supplied to the combustion chamber at the same time. However, the supply of air through the pipes 60, 62, and 64, and the supply of cooling air through the duct 35 does not in any way, interfere with the operation of the holding burners which continue to function, regardless of whether the furnace is being used or is standing by under idling condition. It is desirable to have the holding burners continue to maintain the proper temperature of the furnace when it is not being used at night, as a very little amount of fuel is required to keep up the temperature in a kettle furnace. The supply of heat merely represents the furnace losses which are small in comparison with the fuel that would be required to heat it up if the furnace were completely shut down, and no fire was admitted thereto at night. A materially greater amount of fuel would be necessary to bring the furnace back up to the proper operating temperature in the morning. Thus, it is more desirable to maintain holding burners, unless the furnace is not to be used for a materially long period of time, such as several days.

It is quite obvious, by utilizing the ordinary supply of air to the burners and the additional supply of cooling air through the additional cooling channels to the combustion chamber, the same can be rapidly cooled to the desired degree in a short period of time. The slight amount of steam that is necessary to maintain the fuel line and the burners hot, is insignificant in that it provides additional heat rather than a cooling agent in the control and operation of the furnace when not loaded.

I claim:

1. A kettle furnace control comprising operating burner means to deliver a combustible mixture to the combustion chamber heating the exterior of the kettle in said furnace, a line to deliver fuel under pressure to said burner means, a second line to deliver air under pressure to said burner means to support combustion, independent nozzle means to supply air to the combustion chamber in said furnace to cool the same, control means actuated by the temperature of the bath in said furnace to regulate the supply of heat to said combustion chamber and to shut off the supply of fuel and independent control means operated by the temperature of the bath to turn on the supply of air to said independent nozzle means to cool said furnace when it reaches a predetermined temperature, means actuated by said fuel control means to supply steam through the fuel line to said burner when the fuel is shut off thereto to heat said line and purge the same of fuel, and to shut off said steam when fuel is again supplied through said line to said burner means.

2. A kettle furnace control comprising operating burner means to deliver a combustible mixture to the combustion chamber heating the exterior of the kettle in said furnace, a line to deliver fuel under pressure to said burner means, a second line to deliver air under pressure to said burner means to support combustion, independent nozzle means to supply air to the combustion chamber in said furnace to cool the same, control means actuated by the temperature of the bath in said furnace to regulate the supply of heat to said combustion chamber and to shut off the supply of fuel and independent control means operated by the temperature of the bath to turn on the supply of air to said independent nozzle means to cool said furnace when it reaches a predetermined temperature, holding burner means to continuously deliver a combustible mixture to said furnace combustion chamber, a line to deliver fuel under pressure to said holding burner means, a second line to deliver air under pressure to said holding burner means, said holding burner means continuously delivering a combustible mixture to said furnace regardless of the operation of said operating burner means to maintain pilot operation of the furnace.

3. The structure of claim 2 which also includes a third line to deliver air under pressure continuously to both of said burner means.

4. A temperature control for a kettle furnace containing a liquid maintained molten by heat supplied in the form of fuel and air through independent lines in proportion to support complete combustion in the combustion chambers of the kettle furnace, a control actuated by the temperature of the bath to turn the heat off and turn the heat on and to regulate the same, characterized by a pilot light in said combustion chamber having independent fuel and air lines to continuously maintain a pilot light in the combustion chambers, an independent air cooling nozzle mounted to discharge air from an independent source of air supply to the combustion chambers to cool the same and to cool the kettle, and a second control actuated by the temperature of the bath to turn on and regulate and turn off the supply of cooling air through said cooling nozzle when the first control shuts off the heat in the combustion chamber.

5. The temperature control for a kettle furnace set forth in claim 4 characterized by an independent fuel atomizing air nozzle in said combustion chamber to supply air to atomize the fuel supplied to heat the kettle.

References Cited in the file of this patent

UNITED STATES PATENTS

| | | |
|---|---|---|
| 1,332,182 | Leeds | Feb. 24, 1920 |
| 2,051,401 | Winterstein | Aug. 18, 1936 |
| 2,233,629 | Merrill | Mar. 4, 1941 |
| 2,285,364 | Schipplock | June 2, 1942 |
| 2,336,538 | Geisel | Dec. 14, 1943 |
| 2,359,885 | Vollrath | Oct. 10, 1944 |
| 2,360,167 | Schumann et al. | Oct. 10, 1944 |
| 2,460,392 | Olson | Feb. 1, 1949 |
| 2,471,538 | Oaks | May 31, 1949 |
| 2,527,430 | Kniveton | Oct. 24, 1950 |
| 2,543,982 | Olson | Mar. 6, 1951 |